United States Patent [19]
Hemann et al.

[11] Patent Number: 5,503,408
[45] Date of Patent: Apr. 2, 1996

[54] LIP SEAL FOR A ROTARY SHAFT

[75] Inventors: Curtis B. Hemann, Breese; Lucyna Heyduk, Teutopolis; Joseph E. Forbes, Ramsey; John Crotser, Vandalia, all of Ill.

[73] Assignee: John Crane Inc., Morton Grove, Ill.

[21] Appl. No.: 121,534

[22] Filed: Sep. 16, 1993

[51] Int. Cl.⁶ .................................................. F16J 15/32
[52] U.S. Cl. ........................................ 277/152; 277/208
[58] Field of Search ............................. 277/11, 35, 37, 277/152, 208

[56] References Cited

U.S. PATENT DOCUMENTS

| | | |
|---|---|---|
| 3,940,155 | 2/1976 | Baumle . |
| 3,942,336 | 3/1976 | Schultenkämper ............... 277/152 |
| 3,955,859 | 5/1976 | Stella et al. . |
| 4,243,232 | 1/1981 | Repella ............................ 277/37 |
| 4,721,314 | 1/1988 | Kanayama et al. .............. 277/152 |
| 5,052,696 | 10/1991 | Hatch ............................. 277/37 |

FOREIGN PATENT DOCUMENTS

| | | |
|---|---|---|
| 229906 | 7/1987 | European Pat. Off. . |
| 252636 | 1/1988 | European Pat. Off. . |
| 441741A1 | 8/1991 | European Pat. Off. . |
| 1750427 | 2/1971 | Germany . |
| 3619305 | 7/1987 | Germany ................. 277/152 |
| 3937896 | 5/1991 | Germany ................. 277/152 |
| 97960 | 6/1982 | Japan ..................... 277/152 |
| 229966 | 9/1990 | Japan ..................... 277/152 |
| 1040930 | 9/1966 | United Kingdom ...... 277/152 |

*Primary Examiner*—Scott W. Cummings
*Attorney, Agent, or Firm*—Dorn, McEachran, Jambor & Keating

[57] ABSTRACT

A seal assembly is mounted on a shaft in sealing relationship to provide a sealed chamber in a housing from which the shaft extends. The seal assembly includes a unitary annular seal body attached to an annular retainer. The seal body includes three radial sealing lips in engagement with the shaft. A primary lip is adjacent the sealed chamber and provides the primary fluid seal. A secondary lip is rearward of the primary lip and keeps the primary lip aligned with the shaft. A rearward lip excludes environmental contaminants from entering the sealed chamber.

11 Claims, 2 Drawing Sheets

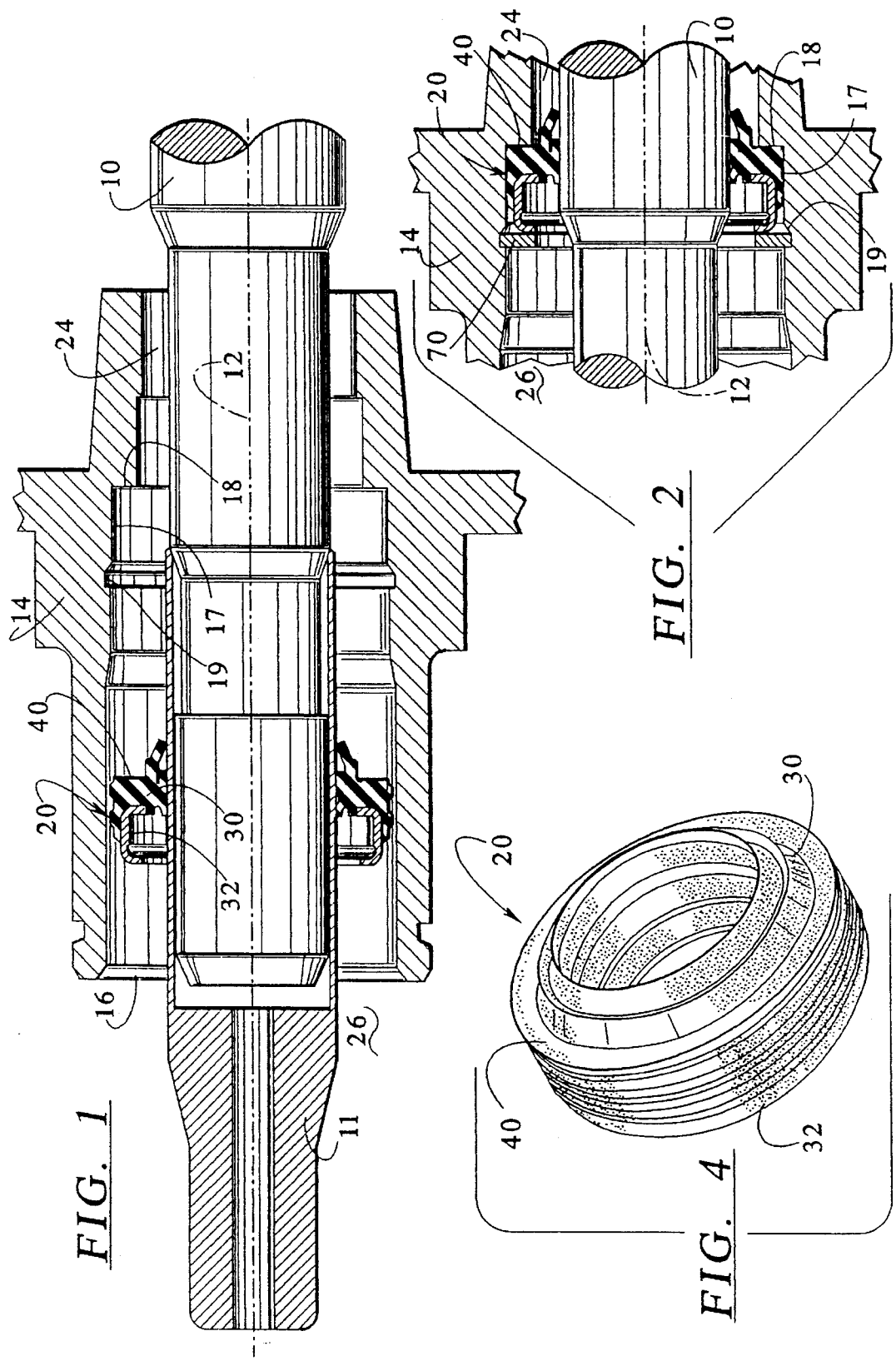

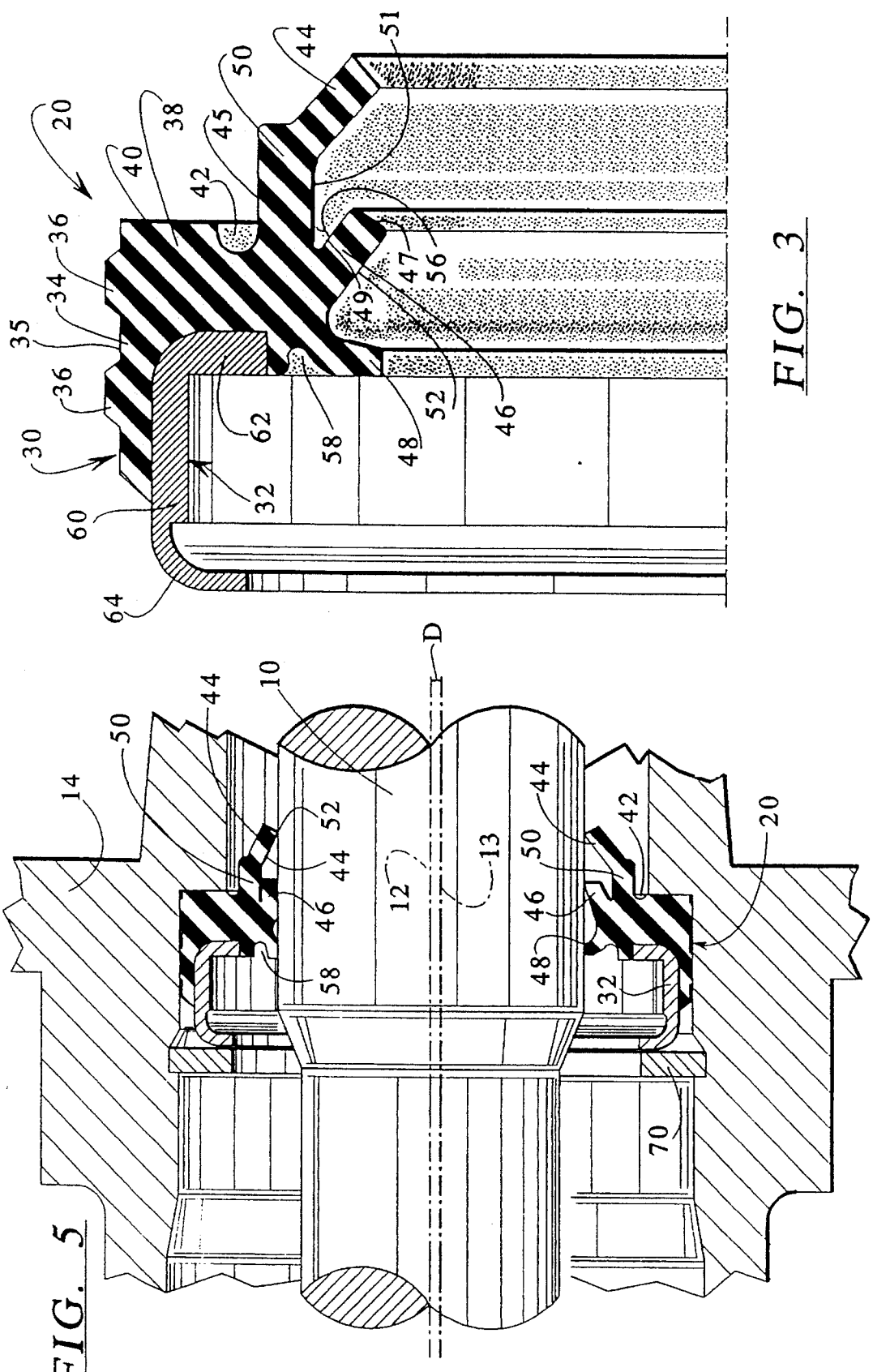

LIP SEAL FOR A ROTARY SHAFT

BACKGROUND OF THE INVENTION

This invention relates to flexible lip seals. More particularly it relates to lip seals which can accomodate significant shaft-to-bore misalignment or dynamic runout.

Lip seals are molded of of an elastomeric or polymeric material and surround a rotating shaft in sealing relationship to provide a fluid or gas tight chamber in a housing from which the shaft extends. Such seals embody components or elements including a retainer to aid installation, withdrawal and retention of a seal body relative to a housing; and one or more elastomeric or polytetrafluorethylene sealing lips.

The lip seals of the present invention are particularly suited for, but not limited to, use in conjunction with automotive air conditioning compressors. This type of service is particularly severe. The refrigerant to be sealed usually has a deliterious effect on elastomeric and other seal materials. The pressure ranges, from vacuum to high, and the temperature ranges are extreme.

In addition, the economies of automobile production require constant effort to reduce weight and cost. Equipment design tends toward light weight or duty. The result is that seals must accomodate more extreme specifications in terms of permissible misalignment between shaft and bore and also dynamic runout.

The seal of the present invention utilizes a unitary seal body having several sealing lips. Previous lip seals have utilized separate seal body components requiring assembly. These prior designs pose several potential problems, including improper installation of seal components, missing seal components, improper axial compression of seal components and a set internal gasket compression. Often, one or more of these problems conspire to result in internal leakage through the assembled seal.

The seal of the present invention provides a solution to these problems.

SUMMARY OF THE INVENTION

In accordance with the present invention there is provided a unitary elastomeric body which defines three radial sealing lips. The first is a primary sealing lip adjacent a chamber of the housing containing a pressurized fluid. A secondary sealing lip serves as an alignment member for the primary sealing lip. The final sealing lip deflects outward of the housing toward the environment during seal installation and excludes environmental contamination from entering the housing chamber.

The seal body is a unitary, annular, elastomeric element molded to a rigid annular retainer. The secondary lip, when deflected during seal installation, comes into contact with a base portion of the primary lip. This deflection, in conjunction with an undercut located above the base portion of the primary lip, encourages alignment of the primary lip with the rotating shaft. This alignment is especially important to accomodate eccentricity between the shaft and the housing and retain a fluid tight seal.

BRIEF DESCRIPTION OF THE DRAWINGS

FIG. 1 is a sectional view of a housing and rotatable shaft showing the seal assembly of the present invention positioned on an installation tool but not yet in its installed position;

FIG. 2 is a sectional view, on an enlarged scale, showing the seal assembly in its installed position;

FIG. 3 is a sectional view of the seal assembly of the present invention;

FIG. 4 is a perspective view of the seal assembly of the present invention; and

FIG. 5 is a sectional view, on an enlarged scale, showing the seal assembly under operating conditions with significant shaft-to-bore misalignment.

DESCRIPTION OF THE PREFERRED EMBODIMENTS

The environment in which the seal of the present invention is employed is first described. A rotating shaft of a device such as an automotive air conditioning compressor is identified by reference numeral 10 in FIG. 1. Shaft 10 rotates about central axis 12 and extends from a fixed housing 14 through a cylindrical bore 16. Annular sealing surface 17 is defined inside housing 14. A radially extending shoulder 18 is formed at one end of sealing surface 17, and a snap ring groove 19 is formed at the opposite end.

Seal 20 surrounds shaft 10 in sealing relation with shaft 10 and with housing 14. It is shown in an intermediate, uninstalled position on an installation tool 11 in FIG. 1. FIG. 2 shows seal 20 in its installed position. When installed, seal 20 separates internal housing chamber 24, which is on one side of the seal, from the atmosphere or environment at 26 exterior to the housing, which is on the opposite side of the seal.

The details of seal 20 are best illustrated in FIGS. 3 and 4. Referring to FIG. 3, seal 20 includes an annular seal body 30 bonded to a rigid retainer 32. Retainer 32 is an annular, ring-like structure preferably made of a metallic material such as steel. It includes a central, annular wall 60, a bonding flange 62 and a removal flange 64. Flange 64 is swaged inwardly only after the seal body and the retainer have been bonded together, for purposes as will become apparent.

Seal body 30 is a unitary elastomeric or polymeric element. It includes an annular ring portion 34 which is bonded to retainer wall 60. Ring portion 34 includes a pair of axially-spaced circumferential ribs 36 formed on an outer surface 35. Ribs 36 are of trapezoidal cross-section. When seal 20 is in its installed postion, ribs 36 sealingly engage annular sealing surface 17 of housing 14. Thus, the outer diameter of ribs 32 when seal 20 is uninstalled should be greater than the inner diameter of sealing wall 17.

Though preferred, the presence of ring portion 34 is not absolutely necessary. A fluid or gas tight seal could be established between seal body 30 and a radial surface within bore 16 without ring portion 34, as will be explained.

Extending radially inwardly from ring portion 34 is radial body portion 38. Body portion 38 is located at the inboard axial end of seal 20, which is the end toward internal housing chamber 24 when seal 20 is installed. The opposite, or outboard, axial end of seal 20 faces the external environment or atmosphere 26.

Body portion 38 defines radial face 40. In the installed position of seal 20, face 40 contacts radial shoulder 18 of housing 14 to provide a fluid tight seal. This seal could serve as the only static seal between housing 14 and seal body 30 (e.g. in the absence of ring portion 34). An annular undercut or recess 42 is formed in face 40 near a radially innermost extent of body portion 38.

Extending from body portion 38 are primary lip 44, alignment lip 46 and outboard lip 48. Each lip is in circumferential contact with shaft 10 when seal 20 is in its installed position. Thus, in the uninstalled position of seal 20, each of the lip components should have an inside diameter considerably less than the outside diameter of shaft 10.

Conical primary lip 44 is joined to and supported upon body portion 38 by annular base portion 50. Annular base portion 50 extends inboard of radial face 40 an axial distance approximately equal to the axial thickness of body portion 38. It is substantially coaxial with ring portion 34 and defines an outer cylindical surface 45 adjacent undercut 42, and an inner cylindrical surface 51. Undercut 42 accomodates radial deflection, or flexure, of base portion 50, for purposes as will become apparent. Lip 44 extends on an incline radially inwardly, and in an axially inboard direction, from base portion 50.

Alignment lip 46 is positioned intermediate primary lip 44 and outboard lip 48. It is joined to, and supported by, body portion 38 at a radially inner terminus of body portion 38 below the juncture of base portion 50 with body portion 38. In an uninstalled position, lip 46 is inclined in a radially inward and an axially inboard direction, defining a conical shape that is substantially coaxial with conical primary lip 44. Lip 46 defines cylindrical outer surface 49, cylindrical inner surface 52 and annular tip 47.

An acute angle 56 is defined between inner surface 51 of base portion 50 and outer surface 49 of lip 46. The thickness of lip 46 is such that on installation into a device in which shaft 10 and bore 16 are coaxial, angle 56 is reduced to approximately zero degrees. Lip 46 is deformed from a conical shape into a cylindrical shape, with its outer surface 49 coaxial with, and contacting, inner cylindrical surface 51 of base portion 50, and its inner surface 52 coaxial with, and contacting, shaft 10. Thus, the thickness of lip 46 is selected to match the nominal spacing between inner surface 51 of base 50 and shaft 10 (when the shaft and bore are coaxial). The length of lip 46 is such that annular tip 46 contacts inner surface 51 of base portion 50 inboard of radial face 40 about midway between the points of connection of base portion 50 to body portion 38 and to primary lip 44. This relationship is illustrated in FIG. 2.

Outboard lip 48 is also joined to, and supported by, body portion 38. It is inclined in an outboard axial direction (opposite the inclination of lips 44 and 46). Axial recess 58 is defined between lip 48 and body portion 38.

In an installed position, seal 20 surrounds shaft 10 with radial face 40 of seal body 30 contacting radial shoulder 18 of housing 14. Ribs 36 of body 30 sealingly engage annular sealing surface 17 of housing 14. Seal 20 is secured in this position by snap ring 70 which is spring-fitted into snap ring groove 19 adjacent rearward removal flange 64 of retainer 32. Seal 20 may be moved to an uninstalled position by flexing or crimping snap ring 70 and removing it. Then, a suitable tool is used to engage removal flange 64 of retainer 32 and withdraw seal 20 from housing 14.

Lips 44, 46 and 48 are in circumferential contact with shaft 10. Primary lip 44 extends in an axially inboard direction and contacts shaft 10 circumferentially adjacent internal housing chamber 24, providing the primary seal between the internal housing chamber and the external environment.

Outboard lip 48 extends in an axially outboard direction and contacts shaft 10 circumferentially adjacent the external environment or atmosphere 26. Lip 48 excludes external contaminants from housing chamber 24 and seals the system should a vacuum develop in housing chamber 24. One such instance when this may occur is during the charging procedure in an automotive air conditioning system. Recess 58 provides rearward lip 48 with a good range of flexure.

Alignment lip 46, as its name suggests, is an alignment member for primary lip 44, that is, it maintains lip 44 in constant coaxial relation to shaft 10. In a device such as an automotive air conditioning compressor, a shaft having a one-half inch diameter may be subject to as much as 0.025 inches of shaft-to-bore misalignment in any radial direction. Such misalignment may be attributable to a number of sources, including misalignment of shaft supporting bearings, use of lightweight or small numbers of support bearings and other parts, or excessive tolerance between the shaft and supporting bearings.

If shaft 10 and primary lip 44 become misaligned as a result of shaft-to-bore misalignment, fluid leakage may result, as lip 44 is the primary fluid seal between internal housing chamber 24 and the external environment. Thus, it is essential that lip 44 and shaft 10 remain concentric, or in alignment, even when shaft 10 and bore 16 are eccentric. Alignment lip 46 serves this purpose.

Should shaft-to-bore misalignment exist, lip 46 is displaced in an amount and direction equal to the displacement between the shaft and bore axies (due to the coaxial contact between shaft 10 and inner surface 52 of lip 46). This displacement, in turn, displaces base portion 50 a corresponding amount due to the coaxial contact between outer surface 49 of lip 46 and inner surface 51 of base portion 50. Displacement of base portion 50 is translated into adjustment of the radial position of lip 44 so as to maintain it coaxial with shaft 10. In this manner, alignment lip 46 acts to continually urge primary lip 44 into uniform contact with shaft 10 about its entire circumference.

FIG. 5 illustrates seal performance in the event of shaft-to-bore misalignment. Axis 12 of shaft 10 and axis 13 of housing bore 16 are offset, i.e., they are out of alignment. Shaft 10 is radially displaced a distance D (where D is the distance between shaft axis 12 and bore axis 13) toward the "upper" portions of the housing bore, as viewed in FIG. 5.

Because alignment lip 46 contacts the outer surface of shaft 10 and inner surface 51 of base portion 50 when shaft 10 and bore 16 are coaxial, this misalignment causes displacement of lip 46 a distance D equal to the displacement of shaft 10. In turn, base portion 50 is also displaced a distance D. Displacement of base portion 50 translates into radial adjustment of the position of primary lip 44 in an amount (D) corresponding to shaft displacement. Thus, radial shifts or movements of the shaft axis are immediately followed by corresponding radial shifts of the primary lip. A constant and concentric surface of contact between shaft 10 and lip 44 is maintained despite eccentricity between shaft 10 and housing bore 16.

Undercut 42 is a significant aid in alignment of primary lip 44, as it accomodates displacement of base portion 50 in response to displacement of alignment lip 46 caused by shaft-to-bore misalignment. Thus, in FIG. 5, the upper portions of undercut 42 have a reduced, or compressed, radial width, while the lower portions of undercut 42 have an expanded radial width, to accomodate the "upward" shifting (as viewed in FIG. 5) of base portion 50 in response to displacement of shaft 10.

Various features of the present invention have been explained with reference to the embodiments shown and described. It must be understood, however, that modification may be made without departing from the spirit and scope of the invention.

We claim:

1. In a housing defining a bore centered around a bore axis and having a rotary shaft centered about a shaft axis, an annular seal mounted around said shaft in sealing relationship to provide a sealed chamber in said housing, said seal including a unitary seal body bonded to a retainer, said seal body comprising:

a body portion extending axially between an outboard face and an inboard face, wherein said outboard face is bonded to said retainer and said inboard face is spaced from said retainer and is closer to said sealed chamber than is said outboard face, and extending radially between an inner diameter and an outer diameter, wherein said inner diameter is adjacent said shaft and said outer diameter is adjacent said housing;

a cylindrical base portion joined to said inboard face of said body portion and extending axially inboard of said body portion, said base portion defining an inner base surface;

a primary lip extending radially inwardly from said base portion and engaging said shaft in sealing relationship; and an alignment lip joined to said inner diameter of said body portion at an axial location between said retainer and said primary lip, said alignment lip defining an inner alignment surface which contacts said shaft and an outer alignment surface which contacts said inner base surface, and said alignment lip having a thickness equal to the radial distance between an outer surface of said shaft and said inner base surface, such that displacement of said shaft axis from said bore axis causes corresponding radial displacement of said base portion and said primary lip to maintain said primary lip concentric about said shaft axis.

2. A seal as recited in claim 1 wherein an undercut is formed in said inboard face of said body portion radially outward of said base portion, said undercut accomodating radial displacement of said base portion.

3. A seal as recited in claim 1 wherein said seal body further comprises an outboard lip adjacent said outboard face of said body portion which extends radially inwardly and axially outboard to contact said shaft to exclude external contaminants from said sealed chamber.

4. A seal as recited in claim 3 wherein a recess is formed in said body portion radially outwardly of said outboard lip to accomodate radial displacement of said outboard lip.

5. A seal as recited in claim 1 wherein said seal body is made of an elastomeric material.

6. A seal as recited in claim 1 wherein said inboard face of said body portion abuts an annular shoulder formed in said housing.

7. A seal as recited in claim 1 wherein said seal body defines a ring portion adjacent said radially outer diameter of said body portion, said ring portion extending coaxially in relation to said base portion.

8. A seal as recited in claim 7 wherein an outer surface of said ring portion includes a plurality of axially spaced circumferential ribs formed therein, said ribs engaging an inner annular sealing surface of said housing in sealing relationship.

9. A seal as recited in claim 1 wherein said housing defines an annular groove, and a snap ring is disposed in said groove to secure said seal in said housing.

10. In a housing defining a bore centered around a bore axis and having a rotary shaft centered about a shaft axis, an annular seal mounted around said shaft in sealing relationship to provide a sealed chamber in said housing, said seal including a unitary seal body bonded to a retainer, said seal body comprising:

a body portion extending axially between an outboard face and an inboard face, wherein said outboard face is bonded to said retainer and said inboard face is spaced from said retainer and is closer to said sealed chamber than is said outboard face, and extending radially between an inner diameter and an outer diameter, wherein said inner diameter is adjacent said shaft and said outer diameter is adjacent said housing;

a cylindrical base portion joined to said inboard face of said body portion and extending axially inboard of said body portion, said base portion defining an inner base surface;

a primary lip extending radially inwardly from said base portion and engaging said shaft in sealing relationship; and an alignment lip joined to said inner diameter of said body portion at an axial location between said retainer and said primary lip, said alignment lip defining an inner alignment surface which contacts said shaft and an outer alignment surface which contacts said inner base surface, and said alignment lip having a length such that an axial extent of said alignment lip contacts said inner base surface at an axial location midway between said inboard face of said body portion and the juncture of said primary lip with said base portion.

11. In a housing defining a bore centered around a bore axis and having a rotary shaft centered about a shaft axis, an annular seal mounted around said shaft in sealing relationship to provide a sealed chamber in said housing, said seal including a unitary seal body bonded to a retainer, said seal body comprising:

a body portion extending axially between an outboard face and an inboard face, wherein said outboard face is bonded to said retainer and said inboard face is spaced from said retainer and is closer to said sealed chamber than is said outboard face, and extending radially between an inner diameter and an outer diameter, wherein said inner diameter is adjacent said shaft and said outer diameter is adjacent said housing;

a cylindrical base portion joined to said inboard face of said body portion and extending axially inboard of said body portion, said base portion defining an inner base surface and having a length approximately equal to the distance between said inboard and outboard faces of said body portion;

a primary lip extending radially inwardly from said base portion and engaging said shaft in sealing relationship; and an alignment lip joined to said inner diameter of said body portion at an axial location between said retainer and said primary lip, said alignment lip defining an inner alignment surface which contacts said shaft and an outer alignment surface which contacts said inner base surface.

* * * * *